(12) United States Patent
Ye et al.

(10) Patent No.: US 12,470,744 B2
(45) Date of Patent: Nov. 11, 2025

(54) MULTI-HYPOTHESIS CROSS COMPONENT PREDICTION

(71) Applicant: Tencent America LLC, Palo Alto, CA (US)

(72) Inventors: Jing Ye, Palo Alto, CA (US); Xin Zhao, Palo Alto, CA (US); Liang Zhao, Palo Alto, CA (US); Han Gao, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 71 days.

(21) Appl. No.: 18/497,885

(22) Filed: Oct. 30, 2023

(65) Prior Publication Data
US 2025/0039439 A1 Jan. 30, 2025

Related U.S. Application Data

(60) Provisional application No. 63/528,590, filed on Jul. 24, 2023.

(51) Int. Cl.
*H04N 19/593* (2014.01)
*H04N 19/105* (2014.01)
(Continued)

(52) U.S. Cl.
CPC ......... *H04N 19/593* (2014.11); *H04N 19/105* (2014.11); *H04N 19/132* (2014.11);
(Continued)

(58) Field of Classification Search
CPC .. H04N 19/593; H04N 19/105; H04N 19/132; H04N 19/136; H04N 19/159;
(Continued)

(56) References Cited

U.S. PATENT DOCUMENTS

2015/0117554 A1 4/2015 Chong et al.
2019/0230352 A1 7/2019 Heo et al.
(Continued)

FOREIGN PATENT DOCUMENTS

WO  WO 2023050072 A1  4/2023

OTHER PUBLICATIONS

Jianle Chen et al., "Algorithm Description for Versatile Video Coding and Test Model 10 (VTM 10)", JVET-S2002, Video Experts Team (JVET) of ITU-T SG 16 WP 3 and ISO/IEC JTC 1/SC 29/WG 11 19th Meeting, Jun. 22-Jul. 1, 2020, 97 pgs.
(Continued)

*Primary Examiner* — Marnie A Matt
(74) *Attorney, Agent, or Firm* — Morgan, Lewis & Bockius LLP

(57) ABSTRACT

The various implementations described herein include methods and systems for coding video. In one aspect, a video bitstream includes a current coding block of an image frame and a syntax element for a cross-component intra prediction (CCIP) mode. The CCIP mode indicates whether each chroma sample of the current coding block is determined based on one or more luma samples. An electronic device generates a plurality of hypothesis values to be used in predicting a first chroma sample by combining a plurality of neighboring luma samples of a first luma sample that is co-located with the first chroma sample using a plurality of coefficients. The first chroma sample is predicted by combining the first luma sample and the plurality of hypothesis values based on a plurality of weighing factors. The electronic device reconstructs the current coding block including the first chroma sample.

20 Claims, 9 Drawing Sheets

(51) Int. Cl.
*H04N 19/132* (2014.01)
*H04N 19/136* (2014.01)
*H04N 19/159* (2014.01)
*H04N 19/172* (2014.01)
*H04N 19/176* (2014.01)
*H04N 19/186* (2014.01)

(52) U.S. Cl.
CPC ......... *H04N 19/136* (2014.11); *H04N 19/159* (2014.11); *H04N 19/172* (2014.11); *H04N 19/176* (2014.11); *H04N 19/186* (2014.11)

(58) Field of Classification Search
CPC .. H04N 19/172; H04N 19/176; H04N 19/186; H04N 19/11; H04N 19/70
USPC ...................................................... 375/240.12
See application file for complete search history.

(56) References Cited

U.S. PATENT DOCUMENTS

| | | |
|---|---|---|
| 2021/0092395 A1 | 3/2021 | Zhang et al. |
| 2021/0195200 A1 | 6/2021 | Chen et al. |
| 2021/0235072 A1 | 7/2021 | Ko et al. |
| 2021/0297656 A1 | 9/2021 | Ma et al. |
| 2021/0329261 A1 | 10/2021 | Ma et al. |
| 2021/0409732 A1 | 12/2021 | Zhao et al. |
| 2022/0030257 A1 | 1/2022 | Deng et al. |
| 2022/0078481 A1 | 3/2022 | Lainema |
| 2022/0239897 A1 | 7/2022 | Deng et al. |
| 2022/0248025 A1 | 8/2022 | Deng et al. |
| 2022/0264101 A1 | 8/2022 | Koo et al. |
| 2022/0286674 A1 | 9/2022 | Wang et al. |
| 2022/0295061 A1 | 9/2022 | Zhang et al. |
| 2022/0345718 A1 | 10/2022 | Rosewarne et al. |
| 2022/0385926 A1 | 12/2022 | Deng et al. |
| 2023/0057680 A1 | 2/2023 | Ma et al. |
| 2023/0117813 A1 | 4/2023 | Deng et al. |
| 2023/0217026 A1 | 7/2023 | Li et al. |
| 2023/0344990 A1 | 10/2023 | Deng et al. |
| 2023/0345015 A1 | 10/2023 | Ye et al. |
| 2023/0370602 A1 | 11/2023 | Onno et al. |
| 2024/0236363 A1* | 7/2024 | Jung ................. H04N 19/577 |
| 2024/0244254 A1* | 7/2024 | Jung ................. H04N 19/52 |
| 2024/0397062 A1 | 11/2024 | Xu |

OTHER PUBLICATIONS

Pekka Astola, et al, "AHG12: Convolutional Cross-Component Model (CCCM) for Intra Prediction", Document: JVET-Z0064-v1, Joint Video Experts Team (JVET) of ITU-T SG 16 WP 3 and ISO/IEC JTC 1/SC 29 26th Meeting, Apr. 20-29, 2022, 5 pgs.

Peter de Rivaz et al., "AV1 Bitstream & Decoding Process Specification", The Alliance for Open Media, Jan. 8, 2019, 681 pgs. Retrieved from the Internet: https://aomediacodec.github.io/av1-spec/av1-spec.pdf.

Xin Zhao et al., "Tool Description for AOMedia Video Model (AVM)", Document: CWG-B100_v1, Alliance for Open Media Codec Working Group, Jan. 3, 2022, 52 pgs.

Yue Chen et al., "An Overview of Core Coding Tools in the AV1 Video Codec", 2018 IEEE Picture Coding Symposium, San Francisco, CA, USA, 5 pgs.

Tencent Technology, ISR/WO, PCT/US2023/036535, Feb. 22, 2024, 17 pgs.

Tencent Technology, ISR/WO, PCT/US2023/036479, Mar. 14, 2024, 13 pgs.

Tencent Technology, ISR/WO, PCT/US2023/036481, Mar. 4, 2024, 16 pgs.

Tencent Technology, ISR/WO, PCT/US2023/036534, Feb. 22, 2024, 12 pgs.

* cited by examiner $$predChromaVal = c_0 e + c_1 a + c_3 c + c_5 P + c_6 B$$

$$predChromaVal = c_0 e + c_2 b + c_4 d + c_5 P + c_6 B$$

MULTI-HYPOTHESIS CROSS COMPONENT PREDICTION

RELATED APPLICATIONS

This application claims priority to U.S. Provisional Patent Application No. 63/528,590, entitled "Multi-Hypothesis Cross Component Prediction," filed Jul. 24, 2023, which is hereby incorporated by reference in its entirety.

TECHNICAL FIELD

The disclosed embodiments relate generally to video coding, including but not limited to systems and methods for cross component intra prediction of video data.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored.

Multiple video codec standards have been developed. For example, video coding standards include AOMedia Video 1 (AV1), Versatile Video Coding (VVC), Joint Exploration test Model (JEM), High-Efficiency Video Coding (HEVC/H.265), Advanced Video Coding (AVC/H.264), and Moving Picture Expert Group (MPEG) coding. Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality.

HEVC, also known as H.265, is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC), also known as H.266, is a video compression standard intended as a successor to HEVC. ITU-T and ISO/IEC published the VVC/H.266 standard in 2020 (version 1) and 2022 (version 2). AV1 is an open video coding format designed as an alternative to HEVC. On Jan. 8, 2019, a validated version 1.0.0 with Errata 1 of the specification was released.

SUMMARY

As mentioned above, encoding (compression) reduces the bandwidth and/or storage space requirements. As described in detail later, both lossless compression and lossy compression can be employed. Lossless compression refers to techniques where an exact copy of the original signal can be reconstructed from the compressed original signal via a decoding process. Lossy compression refers to coding/decoding process where original video information is not fully retained during coding and not fully recoverable during decoding. When using lossy compression, the reconstructed signal may not be identical to the original signal, but the distortion between original and reconstructed signals is made small enough to render the reconstructed signal useful for the intended application. The amount of tolerable distortion depends on the application. For example, users of certain consumer video streaming applications may tolerate higher distortion than users of cinematic or television broadcasting applications. The compression ratio achievable by a particular coding algorithm can be selected or adjusted to reflect various distortion tolerance: higher tolerable distortion generally allows for coding algorithms that yield higher losses and higher compression ratios.

The present disclosure describes applying a plurality of parameters to implement cross component intra prediction of video data in a cross-component intra prediction (CCIP) mode where each of a plurality of chroma samples of a current coding block is determined based on one or more luma samples. A linear or nonlinear weighted sum of multiple versions of luma samples is used to predict a chroma sample, e.g., in multi-hypothesis cross-component prediction (MH-CCP). The multiple versions of luma samples includes a luma sample C that is co-located with the chroma sample and a filtered luma sample that is determined based on neighboring luma samples (e.g., W, N, E, S, NW, NE, SW. SE in FIG. 4) and applied as a filtering input. Each filtering input to a weighted sum is called a hypothesis. Each hypothesis is associated with a weighing factor in MH-CCP. In some embodiments, weighing factors that are applied to generate the linear or nonlinear weighed sum are determined by applying a least mean square calculation kernel to process reconstructed samples of reference blocks of the current coding block.

In accordance with some embodiments, a method of video decoding is provided. The method includes receiving a video bitstream including a current coding block of a current image frame. The video bitstream comprises a syntax element for a cross-component intra prediction (CCIP) mode indicating whether each chroma sample of the current coding block is determined based on one or more luma samples. The method further includes generating a plurality of hypothesis values to be used in predicting a first chroma sample by combining a plurality of neighboring luma samples of a first luma sample that is co-located with the first chroma sample using a plurality of coefficients. The method further includes predicting the first chroma sample by combining the first luma sample and the plurality of hypothesis values based on a plurality of weighing factors. The method further includes reconstructing the current coding block including the first chroma sample.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and/or a decoder component.

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for coding video. Such methods, devices, and systems may complement or replace conventional methods, devices, and systems for video coding.

The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

In accordance with common practice, the various features illustrated in the drawings are not necessarily drawn to scale, and like reference numerals can be used to denote like features throughout the specification and figures.

DETAILED DESCRIPTION

The present disclosure describes applying a plurality of parameters to implement cross component intra prediction of video data in a cross-component intra prediction (CCIP) mode where each of a plurality of chroma samples of a current coding block is determined based on one or more associated luma samples. For example, the CCIP mode includes a multi-hypothesis cross-component prediction (MH-CCP) mode in which multiple versions of luma samples are combined to generate a linear or nonlinear weighted sum as a chroma sample. The multiple versions of luma samples includes a luma sample C that is co-located with the chroma sample and a filtered luma sample that is determined based on neighboring luma samples (e.g., W. N. E. S, NW, NE, SW, SE in FIG. 4). Each filtered luma sample is also called a hypothesis and equal to a weighted combination of two or more neighboring luma samples of the luma sample C. The luma sample C and a plurality of hypothesis values are combined based on a plurality of weighing factors to generate the chroma sample co-located with the luma sample C. In some embodiments, the weighing factors are determined by applying a least mean square calculation kernel to process reconstructed luma and chroma samples of reference blocks of the current coding block.

In some embodiments, the plurality of weighing factors are applied jointly one or two additional weighing factors to combine the luma sample C and hypothesis values with a nonlinear term and a bias term. For example, the cross-shaped 5-tap filter has five inputs consists of a center (C) luma sample that is collocated with a chroma sample to be predicted and four hypothesis values, e.g., each including a combination of two or more of an above/north (N) neighboring sample, a below/south(S) neighboring sample, a left/west (W) neighboring sample, and a right/east (E) neighboring sample. The nonlinear term P represents a square of the center luma sample C that is scaled to a sample value range. The bias term B represents a scalar offset between the inputs and output, and for example, is set to a middle chroma value (512 for 10-bit content). In some embodiments, an output of the filter is determined as a convolution between the weighing factors $c_i$ (also called filter coefficients $c_i$) and the input luma sample C and hypothesis values, and clipped to a range of valid chroma samples. Weighing factors are determined in cross component intra prediction of video data (e.g., in the MH-CCP mode), e.g., by extracting a subset of weighing factors corresponding to at least one neighboring luma sample from a video bitstream and optionally deriving one or more weighing factors that are not received in the video bitstream.

Figure 1:
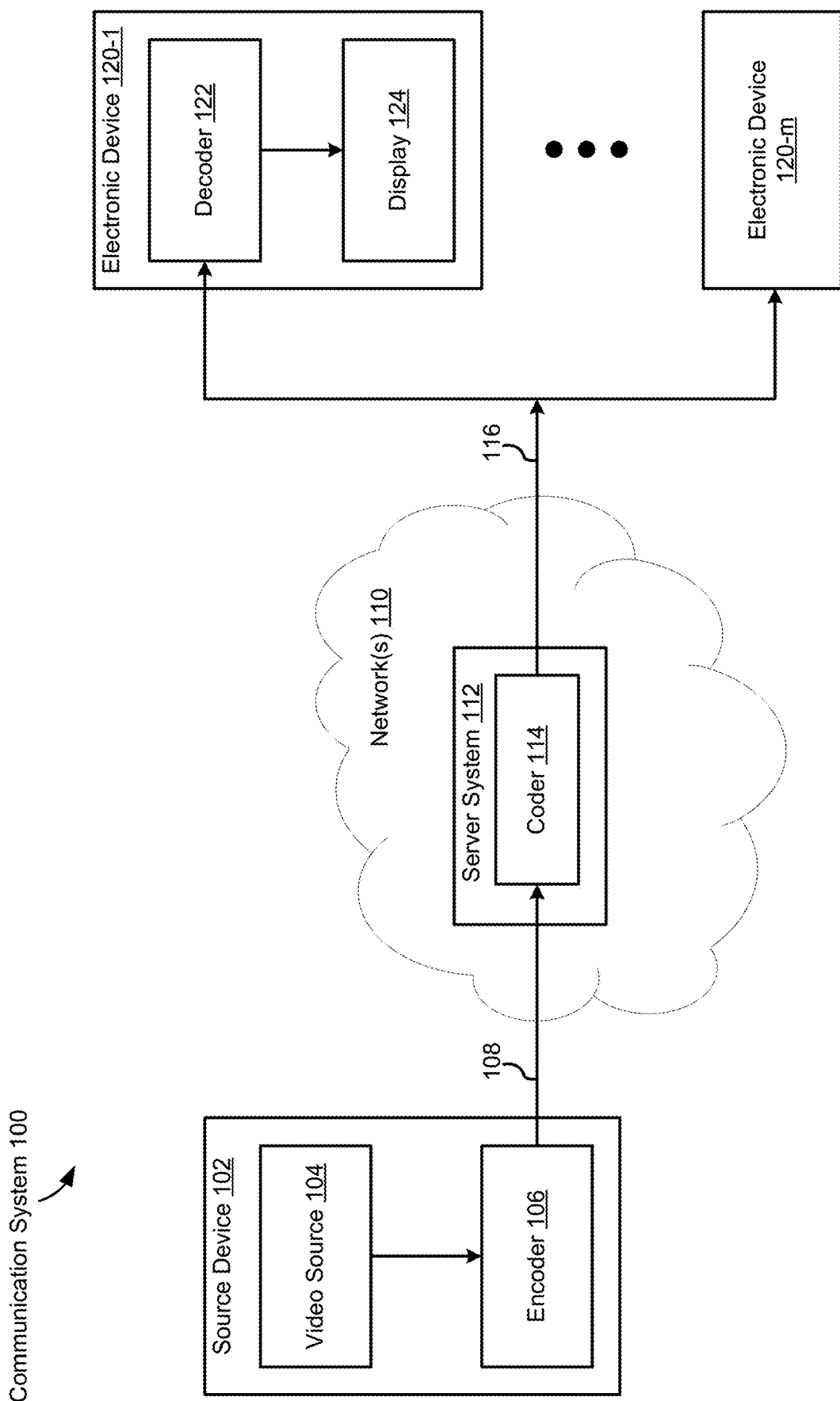
FIG. 1 is a block diagram illustrating an example communication system in accordance with some embodiments.

FIG. 1 is a block diagram illustrating a communication system 100 in accordance with some embodiments. The communication system 100 includes a source device 102 and a plurality of electronic devices 120 (e.g., electronic device 120-1 to electronic device 120-m) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video data to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108.

In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 to recover and optionally display the video pictures.

In some embodiments, the transmissions discussed above are unidirectional data transmissions. Unidirectional data transmissions are sometimes utilized in in media serving applications and the like. In some embodiments, the transmissions discussed above are bidirectional data transmissions. Bidirectional data transmissions are sometimes utilized in videoconferencing applications and the like. In some embodiments, the encoded video bitstream 108 and/or the encoded video data 116 are encoded and/or decoded in accordance with any of the video coding/compressions standards described herein, such as HEVC, VVC, and/or AV1.

Figure 2A:
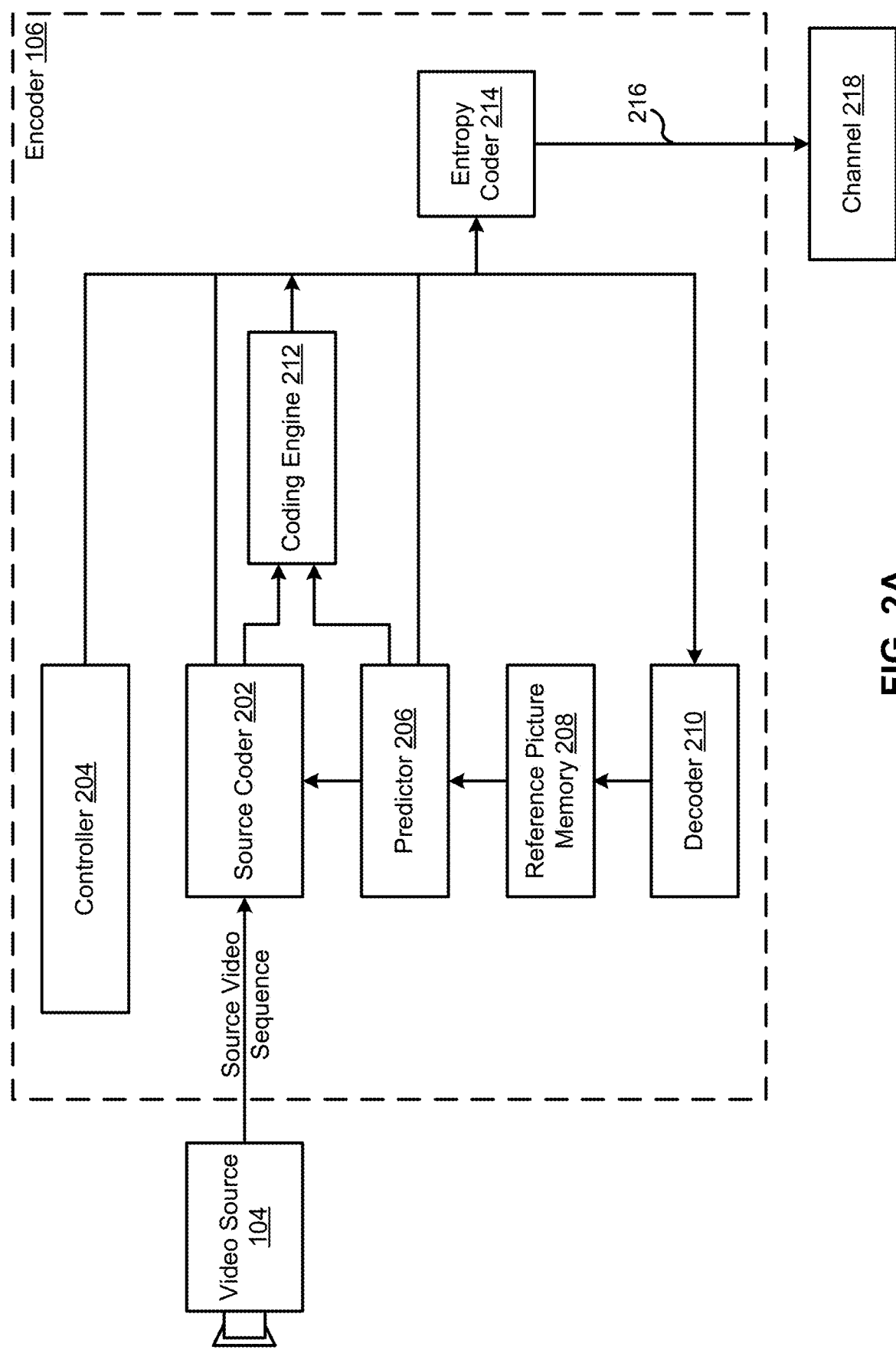
FIG. 2A is a block diagram illustrating example elements of an encoder component in accordance with some embodiments.

FIG. 2A is a block diagram illustrating example elements of the encoder component 106 in accordance with some embodiments. The encoder component 106 receives a source video sequence from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any color space (e.g., BT.601 Y CrCb, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples. The description below focuses on samples.

The encoder component 106 is configured to code and/or compress the pictures of the source video sequence into a coded video sequence 216 in real-time or under other time constraints as required by the application. Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding. This principle of reference picture synchronicity (and resulting drift, if synchronicity cannot be maintained, for example because of channel errors) is known to a person of ordinary skill in the art.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

As part of its operation, the source coder 202 may perform motion compensated predictive coding, which codes an input frame predictively with reference to one or more previously coded frames from the video sequence that were designated as reference image frames. In this manner, the coding engine 212 codes differences between pixel blocks of an input frame and pixel blocks of reference image frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference image frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference image frames and may cause reconstructed reference image frames to be stored in the reference picture memory 208. In this manner, the encoder component 106 stores copies of reconstructed reference image frames locally that have common content as the reconstructed reference image frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. In some cases, as determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
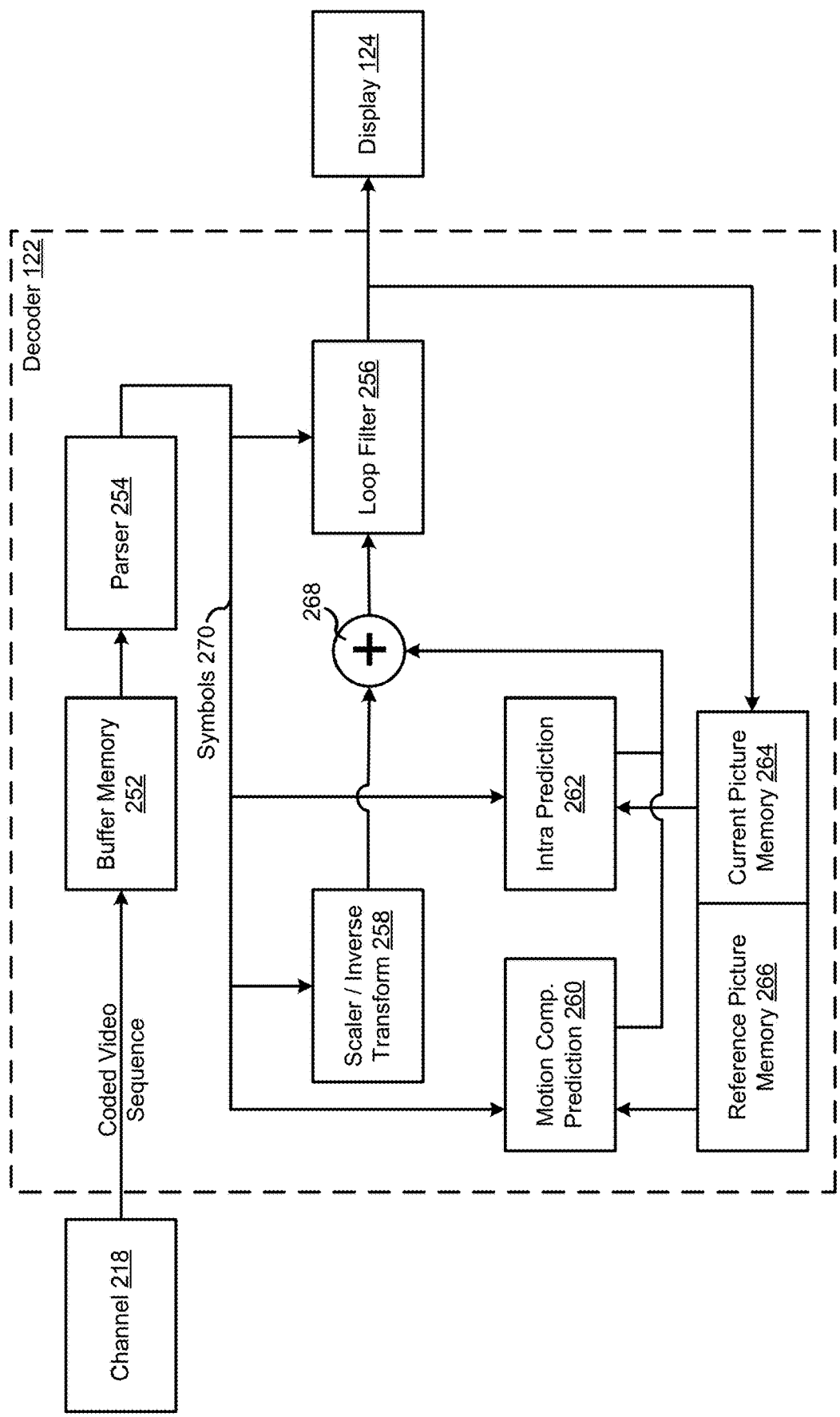
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, for example, temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. In some embodiments, the decoder component 122 is implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and can be advantageously of adaptive size, and may at least partially be implemented in an operating system or similar elements (not depicted) outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

Beyond the functional blocks already mentioned, decoder component 122 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is maintained.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268.

In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation also can include interpolation of sample values as fetched from the reference picture memory 266 when sub-sample exact motion vectors are in use, motion vector prediction mechanisms, and so forth.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values.

The output of the loop filter unit 256 can be a sample stream that can be output to a render device such as the display 124, as well as stored in the reference picture memory 266 for use in future inter-picture prediction.

Certain coded pictures, once fully reconstructed, can be used as reference pictures for future prediction. Once a coded picture is fully reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
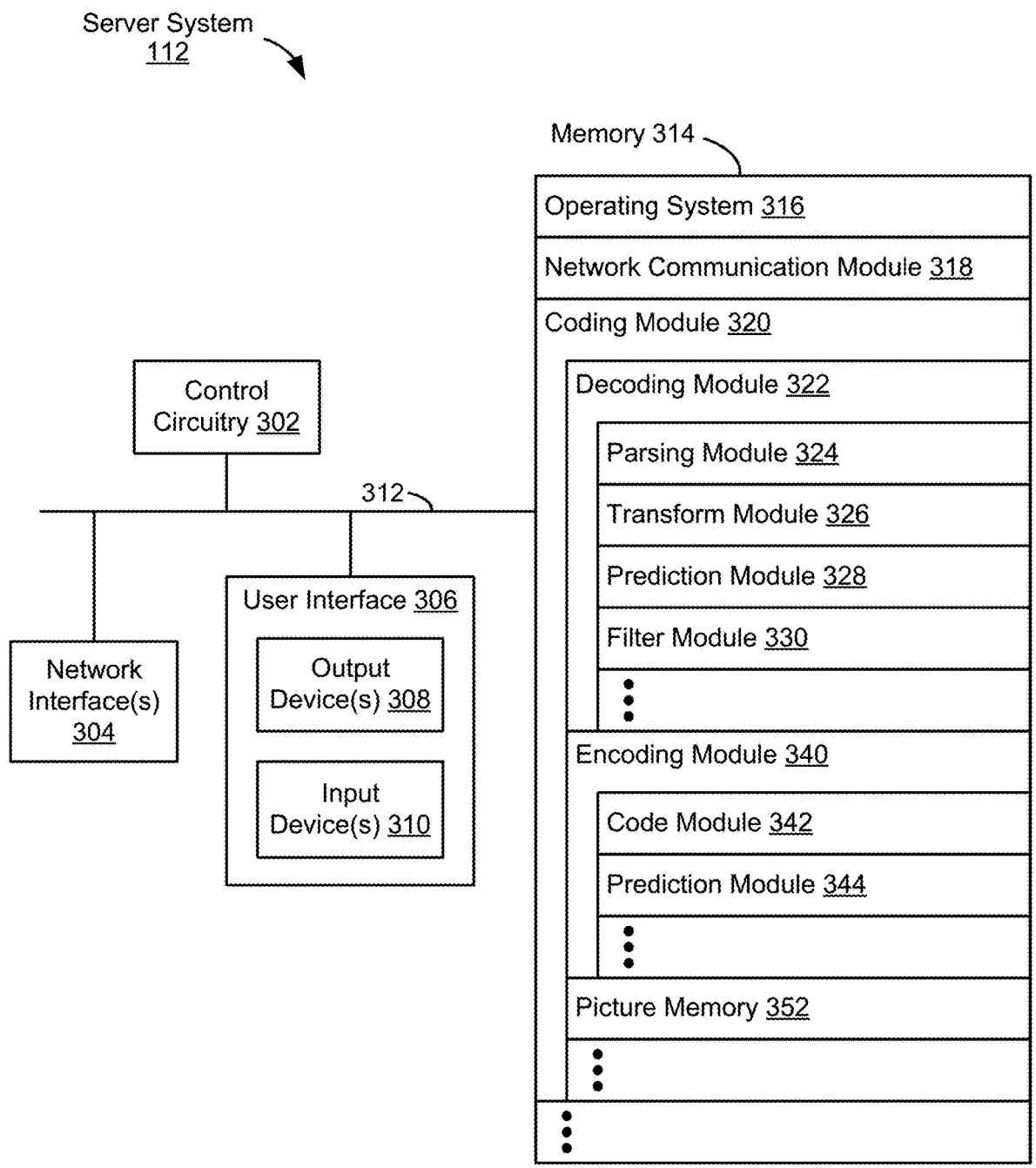
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes one or more field-programmable gate arrays (FPGAs), hardware accelerators, and/or one or more integrated circuits (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:
  - a decoding module 322 for performing various functions with respect to decoding encoded data, such as those described previously with respect to the decoder component 122; and
  - an encoding module 340 for performing various functions with respect to encoding data, such as those described previously with respect to the encoder component 106; and
- a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above, such as an audio processing module.

In some embodiments, the server system 112 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Although FIG. 3 illustrates the server system 112 in accordance with some embodiments, FIG. 3 is intended more as a functional description of the various features that may be present in one or more server systems rather than a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Figure 4:
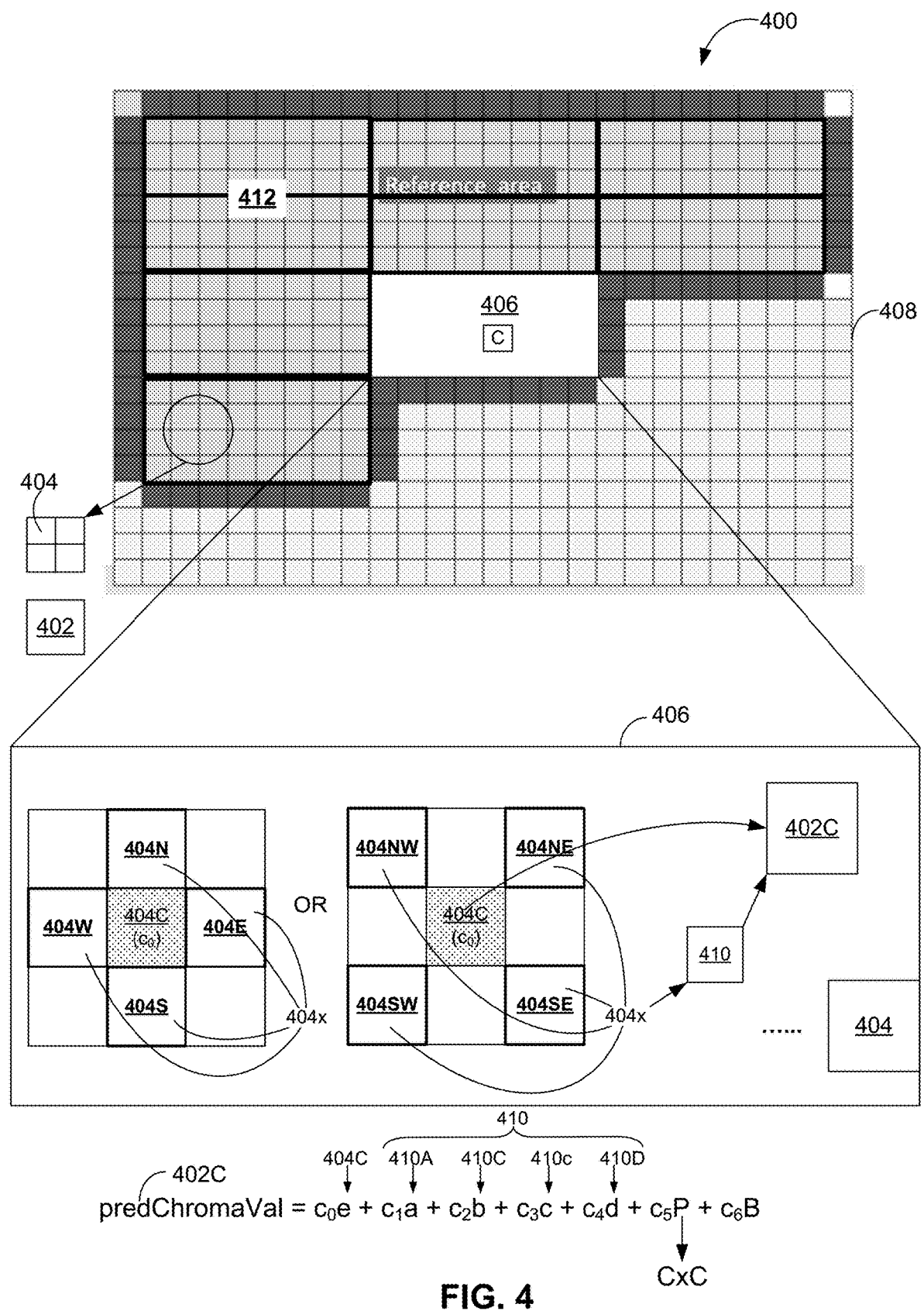
FIG. 4 illustrates an example scheme for generating a chroma sample from a plurality of luma samples in an MH-CCP mode, in accordance with some embodiments.

FIG. 4 illustrates an example scheme 400 for generating a chroma sample 402 from a plurality of luma samples 404 in an MH-CCP mode, in accordance with some embodiments. In some embodiments, a current coding block 406 of a current image frame 408 is coded in a cross-component intra prediction (CCIP) mode. In the CCIP mode, a decoder 122 (FIG. 2B) determines each chroma sample 402 of the current coding block 406 based on one or more luma samples 404 that have been reconstructed. In some situations, the CCIP mode includes a cross-component linear model mode (CCLM) in which a first chroma sample 402C is converted from a reconstructed luma sample 404C that is co-located with the chroma sample based on a linear model. Alternatively, in some situations, the CCIP mode includes a convolutional cross-component mode (CCCM) in which a first chroma sample 402C is predicted directly from a plurality of reconstructed luma samples 404x that is located adjacent to the first luma sample 404C based on a filter shape of a filter. Alternatively and additionally, in some situations, the CCIP mode includes the MH-CCP mode in which a first chroma sample 402C is generated by combining at least the first luma sample 404C that is co-located with the first chroma sample 402C and a plurality of hypothesis values 410 using a plurality of weighing factors ($c_i$). The plurality of neighboring luma samples 404x of the first luma sample 404C are combined using a plurality of coefficients to generate the plurality of hypothesis values 410.

In some embodiments, the plurality of neighboring luma samples $404x$ includes a north neighboring luma sample (also called an above luma sample) 400N, a south neighboring luma sample (also called a below luma sample) 400S, a west neighboring luma sample (also called a left luma sample) 400W, and an east neighboring luma sample (also called a right luma sample) 400E. Further, in some embodiments, the north neighboring luma sample 404N and the south neighboring luma sample 404S are combined to generate a first subset of one or more hypothesis values 410A and 410C. The west neighboring luma sample 404W and the east neighboring luma sample 404E are combined to generate a second subset of one or more hypothesis values 410B and 410D. For example, the north neighboring luma sample 404N and the south neighboring luma sample 404S are combined to generate a first hypothesis value 410A (a) and a third hypothesis value 410C (c), and the west neighboring luma sample 404W and the east neighboring luma sample 404E are combined to generate a second hypothesis value 410B (b) and a fourth hypothesis value 410D (d). Specifically, the four hypothesis values 410 (a-d) are represented as follows:

$$a = w1*N + w1'*S \quad (1)$$

$$b = w2*W + w2'*E \quad (2)$$

$$c = w3*N + w3'*S \quad (3)$$

$$d = w4*W + w4'*E \quad (4)$$

where a, b, c, d, are e are the hypothesis values 410A, 410B, 410C, and 410D, respectively; and N, W, S, and E are luma values of the neighboring luma samples 404N, 404W, 404S, and 404E, respectively; and w1, w1', w2, w2', w3, w3', w4, and w4' are coefficients used to combine the neighboring luma samples $404x$ to generate the hypothesis values 410. In an example, w1 and w1' are equal to 1; w2 and w2' are equal to 1; w3 and w3' are equal to 1 and −1, respectively; and w4 and w4' are equal to 1 and −1, respectively. In some embodiments, each of equations (1)-(4) is normalized. A sum of absolution values of w1 and w1', a sum of absolution values of w2 and w2', a sum of absolution values of w3 and w3', and a sum of absolution values of w4 and w4' are equal to 1.

In accordance with a determination that the MH-CCP mode is applied, the first chroma sample 402 is predicted according to one of the following equations:

$$predChromaVal = c_0 e + c_1 a + c_2 b + c_3 c + c_4 d \quad (5.1)$$

$$predChromaVal = c_0 e + c_1 a + c_2 b + c_3 c + c_4 d + c_5 P \quad (5.2)$$

$$predChromaVal = c_0 e + c_1 a + c_2 b + c_3 c + c_4 d + c_6 B \quad (5.3)$$

$$predChromaVal = c_0 e + c_1 a + c_2 b + c_3 c + c_4 d + c_5 P + c_6 B \quad (5.4)$$

where predChromaVal is a predicted chroma value of the first chroma sample 402C; e is a luma value of the first luma sample 404C that is co-located with the first chroma sample 402C; P is a non-linear term, e.g., equal to (C*C+a median luma value)>>bitdepth; B is an offset; and $c_0$-$c_6$ are weighing factors. In some embodiments (e.g., in equation (5.1)), the non-linear term P and the offset B are not applied to predict the first chroma sample 402C. Alternatively, in some embodiments (e.g., in equation (5.2) or (5.3)), only one of the non-linear term P and the offset B is applied to predict the first chroma sample 402C. Alternatively, in some embodiments (e.g., in equation (5.4)), both the non-linear term P and the offset B are applied to predict the first chroma sample 402C. In some embodiments, B is a median luma value or an average luma value of the luma samples 404 of the current coding block 406.

In some embodiments, the plurality of weighing factors $c_0$-$c_6$ are determined based on a set of one or more luma samples 404 and a set of one or more co-located chroma samples 402 within a reference area 412 of the current coding block 406. The reference area 412 is located in the current image frame 408. Further, in some embodiments, the set of one or more luma samples 404 of the reference area 412 are used to generate corresponding reference hypothesis values based on equations (1)-(4), which are further combined to generate one or more reference chroma samples based on any of equations (5.1)-(5.4). The set of one or more co-located chroma samples 402 and the one or more reference chroma samples are compared to generate a least mean square (LMS) value. The plurality of weighing factors $c_0$-$c_6$ are iteratively adjusted to reduce the LMS value, until the LMS value satisfies a predefined criterion (e.g., in which the LMS value is below a threshold LMS value or is minimized).

In some embodiments, the plurality of neighboring luma samples $404x$ includes a northwest neighboring luma sample (also called a top left luma sample) 400NW, a southeast neighboring luma sample (also called a bottom right luma sample) 400SE, a southwest neighboring luma sample (also called a bottom left luma sample) 400SW, and a northeast neighboring luma sample (also called a top right luma sample) 400NE. Further, in some embodiments, the northwest neighboring luma sample 404NW and the southeast neighboring luma sample 404SE are combined to generate a first subset of one or more hypothesis values. The southwest neighboring luma sample 404SW and the northeast neighboring luma sample 404NE are combined to generate a second subset of one or more hypothesis values. For example, the northwest neighboring luma sample 404NW and the southeast neighboring luma sample 404SE are combined to generate a first hypothesis value 410A (a) and a third hypothesis value 410C (c), and the southwest neighboring luma sample 404SW and the northeast neighboring luma sample 404NE are combined to generate a second hypothesis value 410B (b) and a fourth hypothesis value 410D (d). Specifically, the four hypothesis values 410 (a-d) are represented as follows:

$$a = w1*NW + w1'*SE \quad (6)$$

$$b = w2*SW + w2'*NE \quad (7)$$

$$c = w3*NW + w3'*SE \quad (8)$$

$$d = w4*SW + w4'*NE \quad (9)$$

where a, b, c, d, are e are the four hypothesis values 410A, 410B, 410C, and 410D, respectively; and NW, SW, SE, and NE are luma values of the neighboring luma samples 404NW, 404SW, 404SE, and 404NE, respectively; and w1, w1', w2, w2', w3, w3', w4, and w4' are coefficients used to combine the neighboring luma samples $404x$ to generate the hypothesis values 410. In an example, w1 and w1' are equal to 1; w2 and w2' are equal to 1; w3 and w3' are equal to 1 and −1, respectively; and w4 and w4' are equal to 1 and −1, respectively. In some embodiments, equations (6)-(9) are normalized. A sum of absolution values of w1 and w1', a sum of absolution values of w2 and w2', a sum of absolution values of w3 and w3', and a sum of absolution values of w4 and w4' are equal to 1. In accordance with a determination that the MH-CCP mode is applied, the first chroma sample 402 is predicted by any of equations (5.1)-(5.4).

In some embodiments, the plurality of weighing factors $c_0$-$c_6$ are determined based on a set of one or more luma samples 404 and a set of one or more co-located chroma samples 402 within a reference area 412 of the current coding block 406. The reference area 412 is located in the current image frame 408. Further, in some embodiments, the set of one or more luma samples 404 of the reference area 412 are used to generate corresponding reference hypothesis values based on equations (1)-(4) or based on equations (6)-(9). The corresponding reference hypothesis values are further combined to generate one or more reference chroma samples based on any of equations (5.1)-(5.4). The set of one or more co-located chroma samples 402 and the one or more reference chroma samples are compared to generate an LMS value. The plurality of weighing factors $c_0$-$c_6$ are iteratively adjusted to reduce the LMS value, until the LMS value satisfies a predefined criterion (e.g., in which the LMS value is below a threshold LMS value or is minimized).

In some embodiments, the first luma sample 404C is a downsampled luma sample (when luma and chroma has different dimensions, e.g., 4:2:2 or 4:2:0) using a downsampling filter, so is each neighboring samples (e.g., N, W, E, S, NW, NE, SW, SE) used to derive the corresponding hypothesis value 410. Alternatively, in some embodiments, the first luma sample 404C is an original luma sample co-located with the first chroma sample 402C without any downsampling. Each neighboring samples (e.g., N, W, E, S, NW, NE, SW, SE) used to derive the corresponding hypothesis value 410 includes an original luma sample neighboring to the co-located luma sample without any downsampling.

In some embodiments, at least one weighing factor in $c_0$-$c_6$ is derived based on chroma samples and luma samples within the reference area 412 of the current coding block 406, and the reference area 412 includes one or more coding blocks (e.g., 8 coding blocks in FIG. 4) that are decoded prior to, the current coding block 406. In some embodiments, a subset of the one or more coding blocks is immediately adjacent to the current coding block 406. In some embodiments, a subset of the one or more coding blocks are separated from the current coding block 406 by one or more coding blocks. In some embodiments, the reference area 412 includes at least a portion of one or more rows above the current coding block 406 and/or a portion of one or more columns to the left of the current coding block 406. For example, referring to FIG. 4, the reference area 412 includes 7 rows of luma samples 404 above the current coding block 406 and 9 columns of luma samples 404 to the left of the current coding block 406.

In some embodiments, the at least one weighing factor in $c_0$-$c_6$ is determined by minimising a mean square error (MSE) between predicted and reconstructed chroma samples 402 in the reference area 412. The MSE minimization is performed by calculating autocorrelation matrix for the luma samples 404 and a cross-correlation vector between the luma samples 404 and chroma samples 402 of the reference area 412. Autocorrelation matrix is processed with LDL decomposition and the plurality of weighing factors is calculated using back-substitution. The process follows roughly the calculation of filter coefficients of an adaptive loop filter (ALF) in enhanced compression model (ECM) video coding. LDL decomposition does not use square root operations and uses only integer arithmetic operations.

Figure 5A:
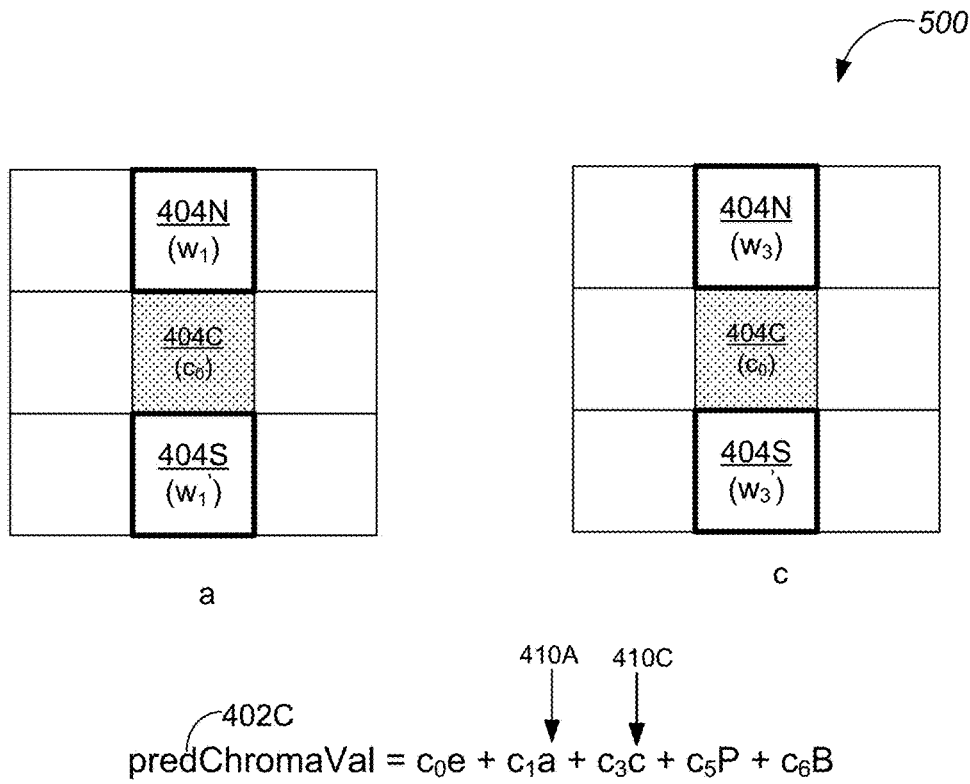
FIG. 5A is a schematic diagram for generating example hypothesis values based on a north neighboring luma sample and a south neighboring luma sample, in accordance with some embodiments.
Figure 5B:
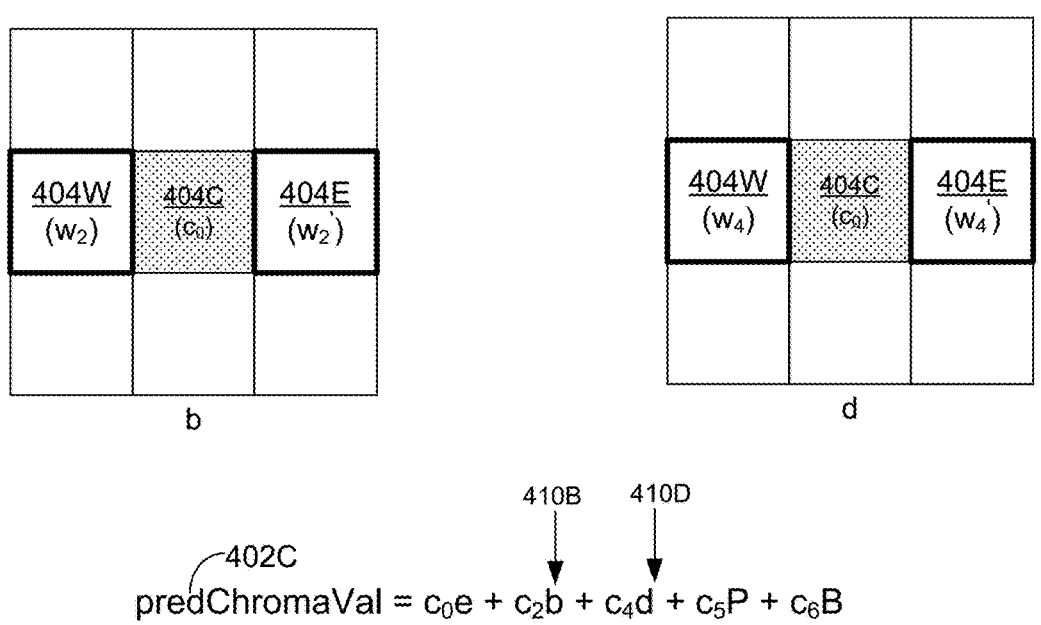
FIG. 5B is a schematic diagram for generating example hypothesis values based on a west neighboring luma sample and an east neighboring luma sample, in accordance with some embodiments.
Figure 5C:
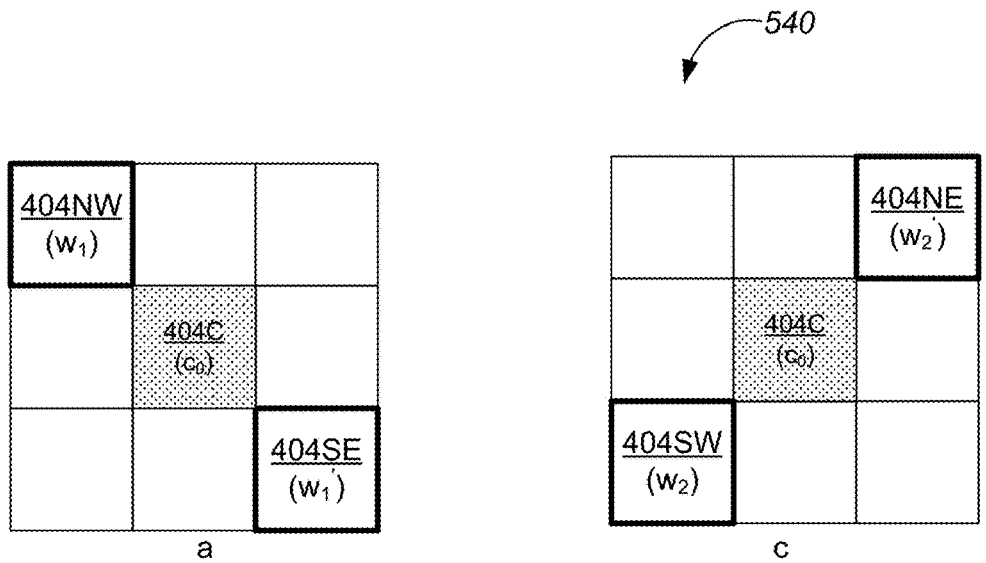
FIG. 5C is a schematic diagram for generating example hypothesis values based on a northwest neighboring luma sample and a southeast neighboring luma sample, in accordance with some embodiments.
Figure 5D:
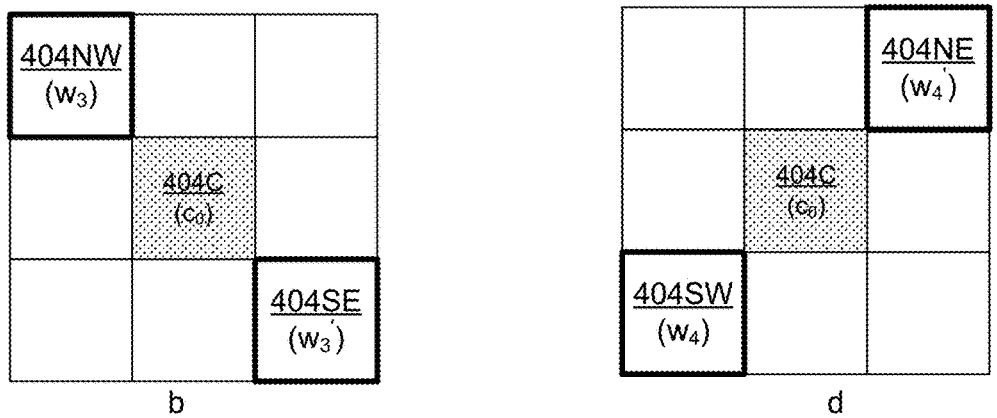
FIG. 5D is a schematic diagram for generating example hypothesis values based on a southwest neighboring luma sample and a northeast neighboring luma sample, in accordance with some embodiments.

FIG. 5A is a schematic diagram 500 for generating example hypothesis values 410 based on a north neighboring luma sample 404N and a south neighboring luma sample 404S, in accordance with some embodiments. FIG. 5B is a schematic diagram 520 for generating example hypothesis values 410 based on a west neighboring luma sample 404W and an east neighboring luma sample 404E, in accordance with some embodiments. FIG. 5C is a schematic diagram 540 for generating example hypothesis values 410 based on a northwest neighboring luma sample 404NW and a southeast neighboring luma sample 404SE, in accordance with some embodiments. FIG. 5D is a schematic diagram 560 for generating example hypothesis values 410 based on a southwest neighboring luma sample 404SW and a northeast neighboring luma sample 404NE, in accordance with some embodiments. A current coding block 406 of a current image frame 408 includes a first chroma sample 402C, a first luma sample 404C co-located with the first chroma sample 402C, and a plurality of neighboring luma samples $404x$ (e.g., 404N, 404S, 404W, 404S, 404NW, 404NE, 404SW, and 404SE) of the first luma sample 404C. The plurality of neighboring luma samples $404x$ of the first luma sample 404C are combined using a plurality of coefficients to generate the plurality of hypothesis values 410, which are further combined to generate the first chroma sample 402C that is co-located with the first luma sample 404C. In some embodiments (e.g., in FIG. 4), the plurality of neighboring luma samples $404x$ include four neighboring luma samples $404x$ that are combined to generate four hypothesis values 410 applied to generate the first chroma sample 402C. Referring to FIGS. 5A-5D, the plurality of neighboring luma samples $404x$ include two neighboring luma samples $404x$ that are combined to generate two hypothesis values 410 applied to generate the first chroma sample 402C.

Specifically, in some embodiments, the plurality of neighboring luma samples $404x$ includes a first neighboring luma sample (e.g., 404N) and a second neighboring luma sample (e.g., 404S), and a first location of the first neighboring luma sample (e.g., 404N) and a second location of the second neighboring luma sample (e.g., 404S) are symmetric with respect to a location of the first luma sample 404C. Further, in some embodiments, the first neighboring luma sample (e.g., 404N) and the second neighboring luma sample (e.g., 404S) are combined to generate a first hypothesis value (e.g., 410A in FIG. 5A) and a second hypothesis value (e.g., 410C in FIG. 5A). Additionally, in some embodiments, the first neighboring luma sample (e.g., 404N) and the second neighboring luma sample (e.g., 404S) are combined in a weighted manner using a first coefficient (e.g., w1) and a second coefficient (e.g., w1') to generate the first hypothesis value (e.g., 410A in FIG. 5A). The first neighboring luma sample (e.g., 404N) and the second neighboring luma sample (e.g., 404S) are combined in a weighted manner using a third coefficient (e.g., w3) and a fourth coefficient (e.g., w3') to generate the second hypothesis value (e.g., 410C in FIG. 5A). The first coefficient is equal to the third coefficient, and the second coefficient is opposite to the fourth coefficient. Further, in some embodiments, the first and second coefficients are normalized, and the third and fourth coefficients are normalized.

Referring to FIG. 5A, in some embodiments, the first and second neighboring luma samples include the north neighboring luma sample 404N and the south neighboring luma sample 404S. The luma samples 404N and 404S are used to generate two hypothesis values 410A and 410C (i.e., a and c), which are further combined with the first luma sample 404C in a weighted manner to generate the first chroma sample 402C according to one of the following equations:

$$predChromaVal = c_0 e + c_1 a + c_3 c \quad (10.1)$$

$$predChromaVal = c_0 e + c_1 a + c_3 c + c_5 P \quad (10.2)$$

$$predChromaVal = c_0 e + c_1 a + c_3 c + c_6 B \quad (10.3)$$

$$predChromaVal = c_0 e + c_1 a + c_3 c + c_5 P + c_6 B \quad (10.4)$$

Referring to FIG. 5B, in some embodiments, the west neighboring luma sample 404W and the east neighboring luma sample 404E are used to generate two hypothesis values 410B and 410D (i.e., b and d), which are further combined with the first luma sample 404C in a weighted manner to generate the first chroma sample 402C according to one of the following equations:

$$predChromaVal = c_0 e + c_2 b + c_4 d \quad (11.1)$$

$$predChromaVal = c_0 e + c_2 b + c_4 d + c_5 P \quad (11.2)$$

$$predChromaVal = c_0 e + c_2 b + c_4 d + c_6 B \quad (11.3)$$

$$predChromaVal = c_0 e + c_2 b + c_4 d + c_5 P + c_6 B \quad (11.4)$$

Referring to FIG. 5C, in some embodiments, the northwest neighboring luma sample 404NW and the southeast neighboring luma sample 404SE are used to generate two hypothesis values 410A and 410C, which are further combined with the first luma sample 404C in a weighted manner to generate the first chroma sample 402C according to any of equations (10.1)-(10.4). Referring to FIG. 5D, in some embodiments, the southwest neighboring luma sample 404SW and the northeast neighboring luma sample 404NE are used to generate two hypothesis values 410B and 410D, which are further combined with the first luma sample 404C in a weighted manner to generate the first chroma sample 402C according to any of equations (11.1)-(11.4).

In some embodiments, based on a plurality of weighing factors (e.g., $c_0$-$c_6$), the first luma sample 404C and the plurality of hypothesis values 410 are combined with at least one of (1) a non-linear term P of a subset of the first luma sample 404C and the plurality of neighboring luma samples 404x and (2) a bias term B. Further, in some embodiments, the subset of the first luma sample 404C and the plurality of neighboring luma samples 404x includes only the first luma sample 404C. The non-linear term P is determined based on the first luma sample 404C. In an example, the non-linear term P is equal to a square of a luma value of the first luma sample 404C. Further, in some embodiments, the bias term B is determined based on at least one of (i) a median value of a set of luma samples 404 of the current coding block 406 and (2) an average of the set of luma samples 404 of the current coding block 406. The set of luma samples 404 optionally includes all luma samples that have been reconstructed for the current coding block 406. The set of luma samples 404 optionally includes less than all of the luma samples that have been reconstructed for the current coding block 406.

In some embodiments, the north neighboring luma sample 404N is located immediately above the first luma sample 404C, and the south neighboring luma sample 404S is located immediately below the first luma sample 404C. In some embodiments, the west neighboring luma sample 404W is located immediately to the left of the first luma sample 404C, and the east neighboring luma sample 404E is located immediately to the right the first luma sample 404C. In some embodiments, a pixel box corresponding to the northwest neighboring luma sample 404NW is connected to a left top corner of a pixel box corresponding to the first luma sample 404C, and a pixel box corresponding to the southeast neighboring luma sample 404SE is connected to a right bottom corner of the pixel box corresponding to the first luma sample 404C. In some embodiments, a pixel box corresponding to the southwest neighboring luma sample 404SW is connected to a left bottom corner of a pixel box corresponding to the first luma sample, and a pixel box corresponding to the northeast neighboring luma sample 404NE is connected to a right top corner of the pixel box corresponding to the first luma sample 404C.

Figure 6:
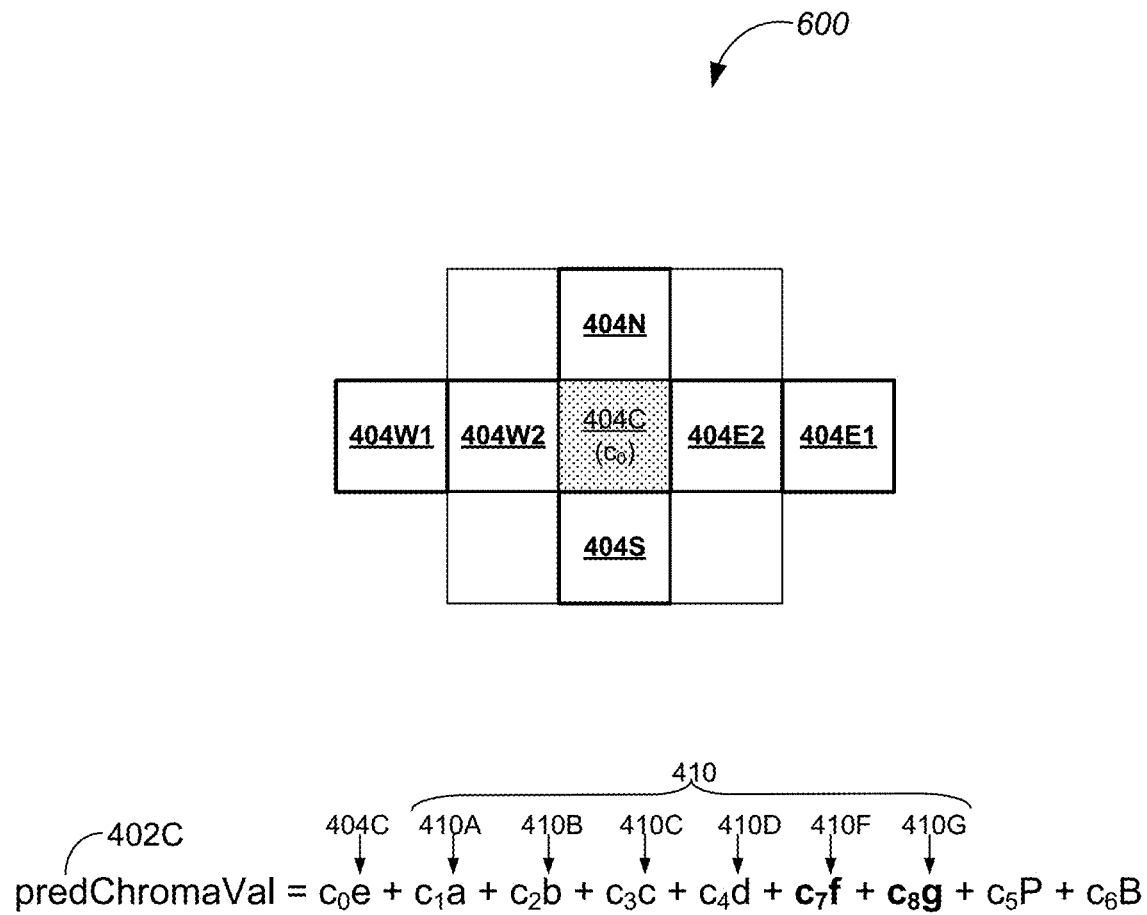
FIG. 6 is a schematic diagram for generating example hypothesis values that are further combined to generate a first chroma sample based on an asymmetric filter shape of a filter, in accordance with some embodiments.

FIG. 6 is a schematic diagram 600 for generating example hypothesis values 410 that are further combined to generate a first chroma sample 402C based on an asymmetric filter shape of a filter, in accordance with some embodiments. In some embodiments, the filter has a number of tapes. For example, the first chroma sample 402C is generated based on a filter having 5 taps (including the first luma sample 404C) in FIG. 4, and based on a filter having 3 taps (including the first luma sample 404C) in each of FIGS. 5A-5D. Referring to FIG. 6, in some embodiments the filter taps or size is further increased, and the filter shape is adjusted. For example, five luma samples 404W1, 404W2, 404C, 404E2, and 404E1 are involved horizontally, and three luma samples 404N, 404C, and 404S are involved vertically, thereby avoiding using an additional line buffer when reference lines above the current coding block 406 are applied to determine the weighing factors $c_0$-$c_6$. The hypothesis values b and d are generated by combining the luma samples 404W1 and 404E1. A fifth hypothesis value 410F (f) and a sixth hypothesis value 410G (g) are generated by combining the luma samples 404W2 and 404E2. Alternatively, in some embodiments, the hypothesis values 410A and 410C (a and c) are combined with the first luma sample 404C (c) in a weighted manner to generate the first chroma value 402C. In some embodiments, the hypothesis values 410B, 410D, 410F, and 410G (b, d, f, and g) are combined with the first luma sample 404C (c) in a weighted manner to generate the first chroma value 402C.

Figure 7:
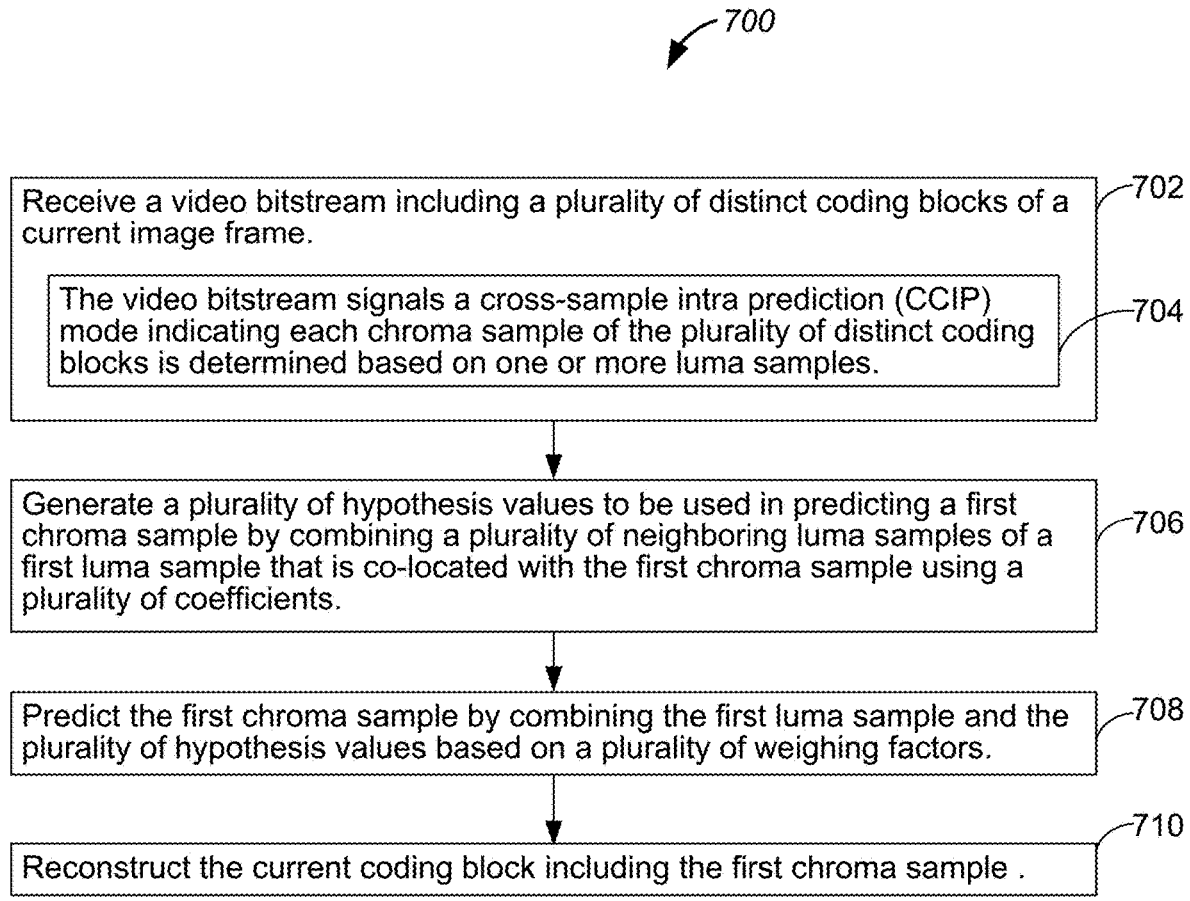
FIG. 7 is a flow diagram illustrating a method of coding video, in accordance with some embodiments.

FIG. 7 is a flow diagram illustrating a method 700 of coding video, in accordance with some embodiments. The method 700 may be performed at a computing system (e.g., the server system 112, the source device 102, or the electronic device 120) having control circuitry and memory storing instructions for execution by the control circuitry. In some embodiments, the method 700 is applied jointly with one or more video codecs, including but not limited to, AV1 AV2, HEVC, VVC, and ECM. In some embodiments, the method 700 is performed by executing instructions stored in the memory (e.g., the coding module 320 of the memory 314) of the computing system. In some embodiments, a current image frame 408 includes (702) a current coding block 406. In some embodiments, the method 700 is applied to use one color component to predict another color component, and downsampling is required on one or more color components. Further, in some embodiments, the method 700 is applied to use red color components to predict green or blue color components. A video bitstream comprises a syntax element for (704) a cross-component intra prediction (CCIP) mode indicating whether each chroma sample 402 of the current coding block is determined based on one or more luma samples 404. The CCIP mode includes the MH-CCP mode in which a first chroma sample 402C is generated by combining at least the first luma sample 404C that is co-located with the first chroma sample 402C and a plurality of hypothesis values 410 using a plurality of weighing factors ($c_i$).

In accordance with some embodiments of this application, each of a plurality of chroma samples 402 of a current coding block 406 (e.g., a first chroma sample 402C identified) is determined based on one or more neighboring luma samples 404x (e.g., identified) and hypothesis values 410 (FIG. 4). For example, a first luma sample 404C and associated hypothesis values 410 are combined to generate a linear or nonlinear weighted sum as the first chroma sample 402. Each of the hypothesis values 410 is determined (706) based on a plurality of neighboring luma samples 404x (e.g., W, N, E, S, NW, NE, SW, SE in FIG. 4) of the first luma sample 404C. For example, each hypothesis value 410 is equal to a weighted combination of two or more neighboring luma samples 410x of the first luma sample 404C. The luma sample C and a plurality of hypothesis values are combined (708) based on a plurality of weighing factors (e.g., $c_0$-$c_6$) to generate the chroma sample co-located with the first luma sample 404C, thereby reconstructing (710) the current coding block 406. In some embodiments, the weighing factors (e.g., $c_0$-$c_6$) are determined by applying a least mean square calculation kernel to process reconstructed luma and chroma samples of reference blocks in a reference area 412 (FIG. 4) of the current coding block 406.

In another embodiment, only a subset of four neighboring luma samples 404x are used to predict the first chroma sample 402C, and four hypothesis values (a, b, c, d) are generated. In one example (FIG. 5A), two hypothesis values 410A and 410C (i.e., a and c) are determined based on the north and south neighboring luma samples 404N and 404S, and used to predict the first chroma value 402C. In another example (FIG. 5B), two hypothesis values 410B and 410D (i.e., b and d) are determined based on the west and east neighboring luma samples 404W and 404E, and used to predict the first chroma value 402C.

In some embodiments, the first luma sample 404C is used to determine the first chroma sample 402C, but P and B are optional according to equations (10.1)-(10.4) and (11.1)-(11.4).

In some embodiment, one or more combination schemes of the neighboring luma samples 404x are applied to generate the first chroma sample 402C. A selection of one or more combinations of luma samples 404x is signaled in a video bitstream from an encoder 106 to a decoder 122, and parsed at the decoder 122. In an example, 3 combinations of the neighboring luma samples 404x are applied. The first combination is {N, S} (FIG. 5A), the second combination is {W, E} (FIG. 5B), and the third combination is {N, S, W, E} (FIG. 4). A combination is selected to generate the first chroma sample 402C according to equation one of (10.1)-(10.4), one of (11.1)-(11.4), or one of (5.1)-(5.4). In another example, 3 combinations of the neighboring luma samples 404x. The first combination is {NW, SE} (FIG. 5C), the second combination is {W, E} (FIG. 5D), and the third combination is {NW, SE, SW, NE} (FIG. 4). A combination is selected to generate the first chroma sample 402C according to equation one of (10.1)-(10.4), one of (11.1)-(11.4), or one of (5.1)-(5.4).

In some embodiments, a, c, e, and P and B are used to derive the chroma prediction values according to equation (10.4). In some embodiments, b, d, e, P and B are used to derive the chroma prediction values according to equation (11.4). In some embodiments, only the linear items are used to derive the chroma prediction values, e.g., in equation (5.1), (10.1), and (11.1). In some embodiments, the linear items and the offset B are used to derive the chroma prediction values, e.g., in equation (5.3), (10.3), and (11.3).

In some embodiments, the filter taps/sizes can be further extended (e.g., in FIG. 6). The filter shapes can also be adjusted. For example, horizontally a five taps filter is involved to increase the performance, whereas a vertically three tap filter is kept to avoid additional line buffer.

Although FIG. 7 illustrates a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments.

(A1) In some implementations, a method 700 is implemented for decoding video data. The method 700 includes receiving (702) a video bitstream including a current coding block of a current image frame, where the video bitstream (704) comprises a syntax element for a cross-component intra prediction (CCIP) mode indicating whether each chroma sample of the current coding block is determined based on one or more luma samples. The method 700 further includes generating (706) a plurality of hypothesis values to be used in predicting a first chroma sample by combining a plurality of neighboring luma samples of a first luma sample that is co-located with the first chroma sample using a plurality of coefficients; predicting (708) the first chroma sample by combining the first luma sample and the plurality of hypothesis values based on a plurality of weighing factors; and reconstructing (710) the current coding block including the first chroma sample.

(A2) In some embodiments of A1, the plurality of neighboring luma samples includes a north neighboring luma sample, a south neighboring luma sample, a west neighboring luma sample, and an east neighboring luma. Combining the plurality of neighboring luma samples of the first luma sample using the plurality of coefficients further includes combining the north neighboring luma sample and the south neighboring luma sample to generate a first subset of one or more hypothesis values and combining the west neighboring luma sample and the east neighboring luma sample to generate a second subset of one or more hypothesis values.

(A3) In some embodiments of A1 or A2, the plurality of hypothesis values includes four hypothesis values a, b, c, and d, which are represented as follows:

$$a = w1 * N + w1' * S$$

$$b = w2 * W + w2' * E$$

$$c = w3 * N + w3' * S$$

-continued $$d = w4 * W + w4' * E$$

where N, W, S, and E are luma values of a north neighboring luma sample, a south neighboring luma sample, a west neighboring luma sample, and an east neighboring luma, respectively, and w1, w1', w2, w2', w3, w3', w4, and w4' are the plurality of coefficients used to combine the plurality of luma samples. The first chroma sample is represented as:

$$predChromaVal \sim c_1 a + c_2 b + c_3 c + c_4 d$$

where predChromaVal is a predicted chroma value of the first chroma sample, and $c_1$, $c_2$, $c_3$ and $c_4$ are weighing factors.

(A4) In some embodiments of A1, the plurality of neighboring luma samples includes a northwest (NW) neighboring luma sample, a southeast (SE) neighboring luma sample, a southwest (SW) neighboring luma sample, and a northeast (NE) neighboring luma. Combining the plurality of neighboring luma samples of the first luma sample using the plurality of coefficients further includes combining the northwest neighboring luma sample and the southeast neighboring luma sample to generate a first subset of one or more hypothesis values and combining the southwest neighboring luma sample and the northeast neighboring luma sample to generate a second subset of one or more hypothesis values.

(A5) In some embodiments of A1 or A4, the plurality of hypothesis values includes four hypothesis values a, b, c, and d, which are represented as follows:

$$a = w1 * NW + w1' * SE$$
$$b = w2 * SW + w2' * NE$$
$$c = w3 * NW + w3' * SE$$
$$d = w4 * SW + w4' * NE$$

where NW, SW, NE, and SE are luma values of a northwest neighboring luma sample, a southwest neighboring luma sample, a northeast neighboring luma sample, and a southeast neighboring luma, respectively, and w1, w1', w2, w2', w3, w3', w4, and w4' are the plurality of coefficients used to combine the plurality of luma samples. The first chroma sample is represented as:

$$predChromaVal \sim c_1 a + c_2 b + c_3 c + c_4 d$$

where predChromaVal is a predicted chroma value of the first chroma sample, and $c_1$, $c_2$, $c_3$ and $c_4$ are weighing factors.

(A6) In some embodiments of A1, the plurality of neighboring luma samples includes a first neighboring luma sample and a second neighboring luma sample, and a first location of the first neighboring luma sample and a second location of the second neighboring luma sample are symmetric with respect to a location of the first luma sample.

(A7) In some embodiments of A6, where combining the plurality of neighboring luma samples of the first luma sample further includes combining the first neighboring luma sample and the second neighboring luma sample to generate a first hypothesis value and a second hypothesis value.

(A8) In some embodiments of A7, where combining the plurality of neighboring luma samples of the first luma sample further includes, in a weighted manner, combining the first neighboring luma sample and the second neighboring luma sample using a first coefficient and a second coefficient to generate the first hypothesis value and combining the first neighboring luma sample and the second neighboring luma sample using a third coefficient and a fourth coefficient to generate the second hypothesis value. The first coefficient is equal to the third coefficient, and the second coefficient is opposite to the fourth coefficient.

(A9) In some embodiments of A8, where the first coefficient and the second coefficient are normalized, and the third coefficient and the fourth coefficient are normalized.

(A10) In some embodiments of any of A6-A9, where the first neighboring luma sample includes a north neighboring luma sample located immediately above the first luma sample, and the second neighboring luma sample includes a south neighboring luma sample located immediately below the first luma sample.

(A11) In some embodiments of any of A6-A9, the first neighboring luma sample includes a west neighboring luma sample located immediately to the left of the first luma sample, and the second neighboring luma sample includes a fourth neighboring luma sample located immediately to the right of the first luma sample.

(A12) In some embodiments of any of A6-A9, a pixel box corresponding to the first neighboring luma sample is connected to a left top corner of a pixel box corresponding to the first luma sample, and a pixel box corresponding to the second neighboring luma sample is connected to a right bottom corner of the pixel box corresponding to the first luma sample.

(A13) In some embodiments of any of A6-A9, a pixel box corresponding to the first neighboring luma sample is connected to a left bottom corner of a pixel box corresponding to the first luma sample, and a pixel box corresponding to the second neighboring luma sample is connected to a right top corner of the pixel box corresponding to the first luma sample.

(A14) In some embodiments of A13, where combining the first luma sample and the plurality of hypothesis values further includes, based on the plurality of weighing factors, combining the first luma sample and the plurality of hypothesis values with at least one of (1) a non-linear term of a subset of the first luma sample and the plurality of neighboring luma samples and (2) a bias term.

(A15) In some embodiments of A14, the subset of the first luma sample and the plurality of neighboring luma samples includes only the first luma sample. The method 700 further includes determining the non-linear term based on the first luma sample.

(A16) In some embodiments of A15, the non-linear term includes a square of the first luma sample.

(A17) In some embodiments of any of A14-A16, the method 700 further includes determining the bias term based on at least one of (i) a median value of a set of luma samples of the current coding block and (2) an average of the set of luma samples of the current coding block.

(A18) In some embodiments of A1-A17, the method 700 further includes determining the plurality of weighing factors based on a set of one or more luma samples and a set of one or more co-located chroma samples within a reference area of the current coding block, where the reference area is located in the current image frame.

(A19) In some embodiments of A18, determining the plurality of weighing factors further includes determining a least mean square (LMS) value based on the set of one or more luma samples and the set of one or more co-located chroma samples and iteratively adjusting the plurality of weighing factors to reduce the LMS value until the LMS value satisfy a predefined criterion.

(A20) In some implementations, a method is implemented for encoding video data. The method includes identifying a first luma sample of a current coding block of a current image frame and a first chroma sample that is co-located with the first luma sample; identifying a plurality of neighboring luma samples of the first luma sample; determining that a plurality of hypothesis values are generated by combining the plurality of neighboring luma samples using a plurality of coefficients; determining that the first chroma sample is generated by combining the first luma sample and the plurality of hypothesis values using a plurality of weighing factors; and generating a video bitstream including luma samples the current coding block of the current image frame, where the video bitstream comprises a syntax element for a multi-hypothesis cross-component prediction (MH-CCP) indicating whether each chroma sample of the current coding block is determined based on one or more luma samples and associated hypothesis values. In some implementations, a subset of the plurality of weighing factors is signaled in the video bitstream. In some implementations, a subset of the plurality of coefficients is signaled in the video bitstream. In some implementations, a subset of the plurality of coefficients is signaled in the video bitstream. In some implementations, an index is signaled to select one of a plurality of combinations of filter taps. The selected combination of filter taps is applied to determine the plurality of hypothesis values.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A20 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A20 above).

The proposed methods may be used separately or combined in any order. Further, each of the methods (or embodiments), encoder, and decoder may be implemented by processing circuitry (e.g., one or more processors or one or more integrated circuits). For example, the one or more processors execute a program that is stored in a non-transitory computer-readable medium. In the following, the term block may be interpreted as a prediction block, a coding block, or a coding unit, i.e., CU.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method for decoding video data, comprising:
receiving a video bitstream including a current coding block of a current image frame, wherein the video bitstream comprises a syntax element for a cross-component intra prediction (CCIP) mode indicating whether each chroma sample of the current coding block is determined based on one or more luma samples;
generating a plurality of hypothesis values to be used in predicting a first chroma sample by combining a plurality of neighboring luma samples of a first luma sample that is co-located with the first chroma sample using a plurality of coefficients, wherein the plurality of hypothesis values comprises:
a first hypothesis value calculated as a first sum of top and bottom neighboring samples using a first set of coefficients;
a second hypothesis value calculated as a second sum of left and right neighboring samples using a second set of coefficients;
a third hypothesis value calculated as a third sum of the top and bottom neighboring samples using a third set of coefficients, wherein the third set of coefficients is different than the first set of coefficients; and
a fourth hypothesis value calculated as a fourth sum of the left and right neighboring samples using a fourth set of coefficients, wherein the fourth set of coefficients is different than the second set of coefficients;
predicting the first chroma sample by combining the first luma sample and the plurality of hypothesis values based on a plurality of weighing factors; and
reconstructing the current coding block including the first chroma sample.

2. The method of claim 1, wherein the plurality of hypothesis values comprises hypothesis values a, b, c, and d, which are represented as follows:

$$a = w1 * N + w1' * S$$
$$b = w2 * W + w2' * E$$
$$c = w3 * N + w3' * S$$
$$d = w4 * W + w4' * E$$

where N, W, S, and E are luma values of the top neighboring luma sample, the bottom neighboring luma sample, the left neighboring luma sample, and the right neighboring luma, respectively, and w1, w1', w2, w2', w3, w3', w4, and w4' are the plurality of coefficients used to combine the plurality of luma samples; and wherein the first chroma sample is represented as:

$$predChromaVal \sim c_1 a + c_2 b + c_3 c + c_4 d$$

where predChromaVal is a predicted chroma value of the first chroma sample, and $c_1$, $c_2$, $c_3$ and $c_4$ are weighing factors.

3. The method of claim 1, wherein;
the first set of coefficients comprises a first coefficient and a second coefficient;
the first coefficient and the second coefficient are normalized;
the second set of coefficients comprises a third coefficient and a fourth coefficient; and
the third coefficient and the fourth coefficient are normalized.

4. The method of claim 1, wherein a pixel box corresponding to a first neighboring luma sample is connected to a left top corner of a pixel box corresponding to the first luma sample, and a pixel box corresponding to a second neighboring luma sample is connected to a right bottom corner of the pixel box corresponding to the first luma sample.

5. The method of claim 1, wherein a pixel box corresponding to a first neighboring luma sample is connected to a left bottom corner of a pixel box corresponding to the first luma sample, and a pixel box corresponding to a second neighboring luma sample is connected to a right top corner of the pixel box corresponding to the first luma sample.

6. The method of claim 1, wherein the plurality of hypothesis values comprises a non-linear hypothesis value.

7. The method of claim 6, wherein the non-linear hypothesis value corresponds to a square of the first luma sample.

8. The method of claim 1, wherein predicting the first chroma sample by combining the first luma sample and the plurality of hypothesis values based on the plurality of weighing factors comprises combining a bias term with the plurality of hypothesis values.

9. The method of claim 8, wherein the bias term is based on at least one of (i) a median value of a set of luma samples of the current coding block and (2) an average of the set of luma samples of the current coding block.

10. The method of claim 1, wherein the plurality of weighing factors are based on a set of one or more luma samples and a set of one or more co-located chroma samples within a reference area of the current coding block, and wherein the reference area is located in the current image frame.

11. A method for encoding video data, comprising:
receiving video data comprising a current block of a current image frame;
generating a plurality of hypothesis values to be used in predicting a first chroma sample of the current block by combining a plurality of neighboring luma samples of a first luma sample that is co-located with the first chroma sample using a plurality of coefficients, wherein the plurality of hypothesis values comprises:
a first hypothesis value calculated as a first sum of top and bottom neighboring samples using a first set of coefficients;
a second hypothesis value calculated as a second sum of left and right neighboring samples using a second set of coefficients;
a third hypothesis value calculated as a third sum of the top and bottom neighboring samples using a third set of coefficients, wherein the third set of coefficients is different than the first set of coefficients; and
a fourth hypothesis value calculated as a fourth sum of the left and right neighboring samples using a fourth set of coefficients, wherein the fourth set of coefficients is different than the second set of coefficients;
predicting the first chroma sample by combining the first luma sample and the plurality of hypothesis values based on a plurality of weighing factors; and
encoding the current coding block including the first chroma sample.

12. The method of claim 11, wherein the plurality of hypothesis values comprises hypothesis values a, b, c, and d, which are represented as follows:

$$a = w1 * NW + w1' * SE$$
$$b = w2 * SW + w2' * NE$$
$$c = w3 * NW + w3' * SE$$
$$d = w4 * SW + w4' * NE$$

where N, W, S, and E are luma values of the top neighboring luma sample, the bottom neighboring luma sample, the left neighboring luma sample, and the right neighboring luma, respectively, and w1, w1', w2, w2', w3, w3', w4, and w4' are the plurality of coefficients used to combine the plurality of luma samples; and wherein the first chroma sample is represented as:

$$predChromaVal \sim c_1 a + c_2 b + c_3 c + c_4 d$$

where predChromaVal is a predicted chroma value of the first chroma sample, and $c_1$, $c_2$, $c_3$ and $c_4$ are weighing factors.

13. The method of claim 11, wherein:
the first set of coefficients comprises a first coefficient and a second coefficient;
the first coefficient and the second coefficient are normalized;
the second set of coefficients comprises a third coefficient and a fourth coefficient; and the third coefficient and the fourth coefficient are normalized.

14. The method of claim 11, wherein the plurality of hypothesis values comprises a non-linear hypothesis value.

15. The method of claim 11, wherein predicting the first chroma sample by combining the first luma sample and the plurality of hypothesis values based on the plurality of weighing factors comprises combining a bias term with the plurality of hypothesis values.

16. The method of claim 11, wherein the plurality of weighing factors are based on a set of one or more luma samples and a set of one or more co-located chroma samples within a reference area of the current coding block, and wherein the reference area is located in the current image frame.

17. A non-transitory computer-readable storage medium storing one or more sets of instructions configured for execution by a computing device having control circuitry and memory, the one or more sets of instructions comprising instructions for:
   processing a bitstream of visual media data according to a format rule, wherein:
      the bitstream includes a current coding block of a current image frame and a syntax element for a cross-component intra prediction (CCIP) mode indicating whether each chroma sample of the current coding block is determined based on one or more luma samples; and
      the format rule specifies that:
         a plurality of hypothesis values to be used in predicting a first chroma sample is to be generated by combining a plurality of neighboring luma samples of a first luma sample that is co-located with the first chroma sample using a plurality of coefficients, wherein the plurality of hypothesis values comprises:
            a first hypothesis value calculated as a first sum of top and bottom neighboring samples using a first set of coefficients;
            a second hypothesis value calculated as a second sum of left and right neighboring samples using a second set of coefficients;
            a third hypothesis value calculated as a third sum of the top and bottom neighboring samples using a third set of coefficients, wherein the third set of coefficients is different than the first set of coefficients; and
            a fourth hypothesis value calculated as a fourth sum of the left and right neighboring samples using a fourth set of coefficients, wherein the fourth set of coefficients is different than the second set of coefficients;
         the first chroma sample is to be predicted by combining the first luma sample and the plurality of hypothesis values based on a plurality of weighing factors; and
         the first chroma sample is to be reconstructed using the predicted first chroma sample.

18. The non-transitory computer-readable storage medium of claim 17, wherein:
   the first set of coefficients comprises a first coefficient and a second coefficient;
   the first coefficient and the second coefficient are normalized;
   the second set of coefficients comprises a third coefficient and a fourth coefficient; and
   the third coefficient and the fourth coefficient are normalized.

19. The non-transitory computer-readable storage medium of claim 17, wherein the plurality of hypothesis values comprises a non-linear hypothesis value.

20. The non-transitory computer-readable storage medium of claim 17, wherein predicting the first chroma sample by combining the first luma sample and the plurality of hypothesis values based on the plurality of weighing factors comprises combining a bias term with the plurality of hypothesis values.

* * * * *